(12) United States Patent
Cheng et al.

(10) Patent No.: US 7,990,953 B2
(45) Date of Patent: Aug. 2, 2011

(54) SYSTEMS AND METHODS FOR UTILIZING A SPARE SWITCH IN A DISTRIBUTED VOIP SYSTEM

(75) Inventors: Andy A. Cheng, Los Altos, CA (US); Glen K. Okita, Los Altos, CA (US); Robert R. Burns, Campbell, CA (US)

(73) Assignee: Shoretel, Inc., Sunnyvale, CA (US)

( * ) Notice: Subject to any disclaimer, the term of this patent is extended or adjusted under 35 U.S.C. 154(b) by 309 days.

(21) Appl. No.: 12/242,332

(22) Filed: Sep. 30, 2008

(65) Prior Publication Data

US 2010/0080213 A1    Apr. 1, 2010

(51) Int. Cl.
*H04L 12/66*    (2006.01)

(52) U.S. Cl. ........ 370/352; 370/208; 370/210; 370/430; 709/224; 709/239

(58) Field of Classification Search .................. 370/352; 709/224, 239
See application file for complete search history.

(56) References Cited

U.S. PATENT DOCUMENTS

| | | | |
|---|---|---|---|
| 6,961,857 B1 * | 11/2005 | Floryanzia | ...................... 726/14 |
| 6,996,059 B1 | 2/2006 | Tonogai | |
| 7,003,091 B1 | 2/2006 | Burns et al. | |
| 7,167,486 B2 | 1/2007 | Cornelius et al. | |
| 7,379,540 B1 | 5/2008 | Van Gundy | |
| 7,386,114 B1 | 6/2008 | Robesky | |
| 7,797,420 B1 * | 9/2010 | Mackie et al. | ................. 709/224 |
| 2003/0145108 A1 * | 7/2003 | Joseph et al. | ................. 709/239 |
| 2006/0233340 A1 | 10/2006 | Tovino et al. | |
| 2007/0041366 A1 * | 2/2007 | Vugenfirer et al. | ........... 370/352 |
| 2007/0171098 A1 | 7/2007 | Basart et al. | |
| 2008/0010163 A1 | 1/2008 | Kish | |
| 2008/0215910 A1 * | 9/2008 | Gabriel et al. | .................... 714/4 |

OTHER PUBLICATIONS

International Search Report Application No. PCT/US2009/058235 mailed on Nov. 20, 2009; 3 pages.
Written Opinion Application No. PCT/US2009/058235 mailed on Nov. 20, 2009; 9 pages.

* cited by examiner

*Primary Examiner* — Robert W Wilson
*Assistant Examiner* — Mohamed Kamara
(74) *Attorney, Agent, or Firm* — Kilpatrick Townsend & Stockton LLP

(57) ABSTRACT

A distributed VoIP system includes a network and a first switch at a first site coupled to the network. The first switch is configured to provide telephony services to a first communication device. The system also includes a second switch at a second site coupled to the network. The second switch is configured to provide telephony services to a second communication device. The system also includes a spare switch coupled to the network. The spare switch is configured to provide telephony services to the first communication device if the first communication device is unable to register with the first switch, and the spare switch is configured to provide telephony services to the second communication device if the second communication device is unable to register with the second switch.

24 Claims, 6 Drawing Sheets

SYSTEMS AND METHODS FOR UTILIZING A SPARE SWITCH IN A DISTRIBUTED VOIP SYSTEM

BACKGROUND OF THE INVENTION

The present invention relates in general to Voice over-Internet Protocol (VoIP) technology, and more particularly, to systems and methods of utilizing a spare telephony switch to provide services in a distributed VoIP system.

Distributed VoIP systems comprise a set of switches and servers distributed across multiple sites. Distributed VoIP systems offer applications enabled by the integration of computer systems with telephony services. The software that supports the computer-integrated functionality is often implemented as a client-server environment in which the participants or clients (distributed telephony users) communicate with a server. Computer-integrated features rely not only on a server's application platform, but also on the availability of the network, switches, servers, and application services.

Availability is important for VoIP systems. Availability is often used to compare VoIP systems to traditional phone service provided over the public switched telephone network (PSTN). To achieve required levels of availability, many VoIP systems have redundancies configured into the system that can be used in the event of a failure in the system. As an example, a conventional distributed VoIP system may be configured to have enough extra capacity on the switches at each site to support a switch failure. If a switch fails, the endpoints on the failed switch can be re-distributed to available switches at the same site. This redundancy cannot be shared with other sites, however, because each site has different configuration requirements. Thus, to achieve required levels of availability, redundant capacity is needed for each site.

The cost of providing such redundancy can be prohibitive. For example, an "N+1" level of redundancy requires sufficient extra capacity at each site to support the failure of any single switch. Availability can be improved by adding second, third, or fourth level redundancy. However, increasing redundancy by adding additional switches at each site is costly in a distributed VoIP system.

Thus, there is a need for improved systems and methods of providing redundancy in a distributed VoIP system.

BRIEF SUMMARY OF THE INVENTION

The present invention provides systems and methods for providing redundancy in a distributed VoIP system. Merely by way of example, embodiments of the present invention provide methods for utilizing a spare switch to provide redundancy in a distributed VoIP system. Such embodiments may be used, for example, to lower the costs of providing extra capacity and to achieve required levels of system availability. However, the scope of embodiments of the present invention is broader than this particular implementation and can be applied to other implementations utilizing spare switches.

In accordance with an embodiment of the invention, a method for providing telephony services in a distributed VoIP system is provided. The method includes receiving a request to register a communication device at a first site. The first site is one of a plurality of sites in the distributed VoIP system. The method also includes determining if there is a local spare switch at the first site. If the first site does not have a local spare switch, the method includes identifying a remote spare switch at a second site and registering the communication device with the remote spare switch.

In one embodiment, after registering the communication device with the remote spare switch, the method also includes transferring the registration of the communication device from the remote spare switch to a switch at the first site, and configuring the remote spare switch as a spare switch.

In another embodiment, after receiving the request to register the communication device at the first site and prior to registering the communication device with the remote spare switch, the method includes waiting a period of time. The period of time is predetermined based at least in part on a time duration required to re-boot a failed switch.

In another embodiment, the request to register the communication device at the first site is sent following a failure of a switch at the first site, and the communication device is registered with the remote spare switch without interrupting a call established while the communication device was registered with the switch at the first site.

In yet another embodiment, the request to register the communication device at the first site is sent following a failure of a switch at the first site, and the method includes registering one or more additional communication devices with the remote spare switch. The one or more additional communication devices being registered with the switch that failed prior to its failure.

In accordance with another embodiment of the invention, a system for providing telephony services in a distributed VoIP system is provided. The system includes a network and a first switch at a first site coupled to the network. The first switch is configured to provide telephony services to a first communication device. The system also includes a second switch at a second site coupled to the network. The second switch is configured to provide telephony services to a second communication device. The system also includes a spare switch coupled to the network. The spare switch is configured to provide telephony services to the first communication device if the first communication device is unable to register with the first switch, and the spare switch is configured to provide telephony services to the second communication device if the second communication device is unable to register with the second switch.

In one embodiment, the first communication device and the second communication device are selected from a group consisting of IP phone, soft phone, button box, conference bridge port, and IP trunk.

In another embodiment, the spare switch is configured to be in a standby mode if the first communication device is registered with the first switch and the second communication device is registered with the second switch.

Numerous benefits are achieved using the present invention over conventional techniques. For example, an embodiment according to the present invention provides redundant switch capacity in a distributed VoIP system at a lower cost than conventional techniques. Costs are reduced because fewer switches are needed. Additionally, because fewer switches are needed, embodiments of the present invention reduce the space and utility requirements of a distributed VoIP system. Furthermore, embodiments according to the present invention provide increased system availability.

Depending on the embodiment, one or more of these benefits may exist. These and other benefits are described throughout the specification and more particularly below.

DETAILED DESCRIPTION OF THE INVENTION

In accordance with embodiments of the present invention, improved systems and methods of providing telephony services in a distributed VoIP system are provided. Some embodiments include utilizing a spare switch to provide redundant capacity in a distributed VoIP system. Other embodiments include utilizing a spare switch to increase the availability of a distributed VoIP system. These and other embodiments of the invention, as well as other features and advantages, are described in more detail below.

Figure 1:
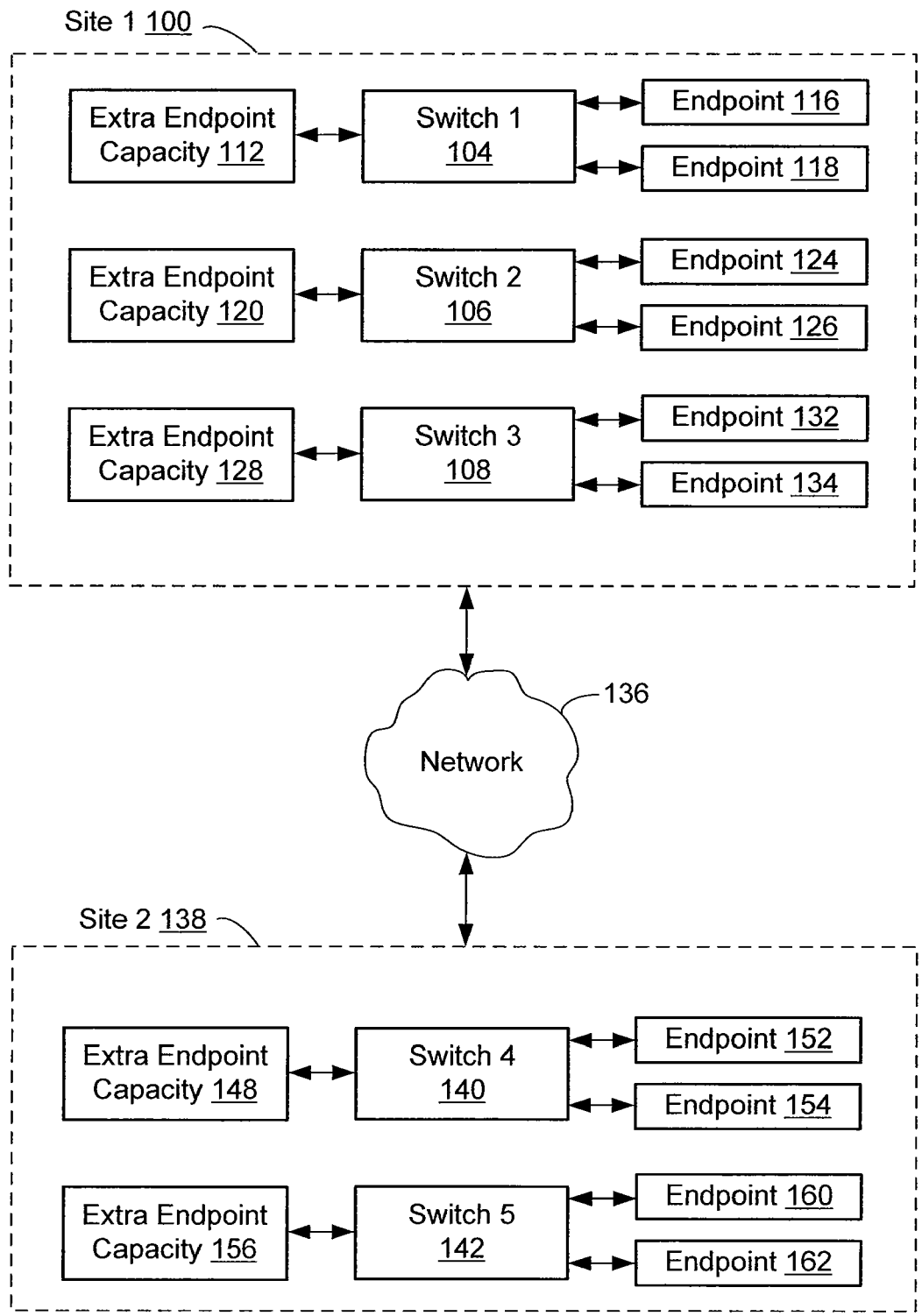
FIG. 1 is a simplified block diagram of a distributed VoIP system.

FIG. 1 is a simplified block diagram of a distributed VoIP system. The system illustrated in FIG. 1 includes a first site 100 coupled with a second site 138 by network 136. First site 100 includes first switch 104, second switch 106, and third switch 108. First switch 104 is coupled to endpoints 116, 118 and has extra endpoint capacity 112. Second switch 106 is coupled to endpoints 124, 126 and has extra endpoint capacity 120. Third switch 108 is coupled to endpoints 132, 134 and has extra endpoint capacity 128. Switches 104, 106, 108 and endpoints 116, 118, 124, 126, 132, 134 can communicate with each other on a local network at first site 100.

Second site 138 includes fourth switch 140 and fifth switch 142. Fourth switch 140 is coupled to endpoints 152, 154 and has extra endpoint capacity 148. Fifth switch 142 is coupled to endpoints 160, 162 and has extra endpoint capacity 156. Switches 140, 142 and endpoints 152, 154, 160, 162 can communicate with each other on a local network at second site 138.

As used herein, an endpoint is a communication device that allows a user to communicate by making or receiving phone calls, voice messages, or other types of communications. Endpoints may include IP phones, soft phones, button boxes, conference bridge ports, "virtual phones" (e.g. extensions that are not assigned to a specific device), IP trunks (e.g. endpoints that can make inbound and outbound calls to the PSTN and to other telephony systems), and other communication devices.

The VoIP system illustrated in FIG. 1 may provide redundant capacity by having enough extra endpoint capacity at each site to support a switch failure. For example, if each of the extra endpoint capacities 112, 120, 128, 148, 156 in FIG. 1 can support two additional endpoints, then each of the switches 104, 106, 108, 140, 142 has the capacity to support a total of four endpoints. Thus, in this example, if one of the switches at first site 100 fails, the remaining two switches have extra capacity for four additional endpoints and thus can support the two endpoints from the failed switch. Similarly, if one of the switches at second site 138 fails, the remaining switch has extra capacity for two additional endpoints and thus can support the two endpoints from the failed switch.

Thus, if a switch fails, the endpoints on the failed switch can be re-distributed to other switches at the same site. This redundancy cannot be shared with other sites, however, because each site has different configuration requirements (e.g. time zones, language preferences, dialing prefixes, local area codes).

Figure 2:
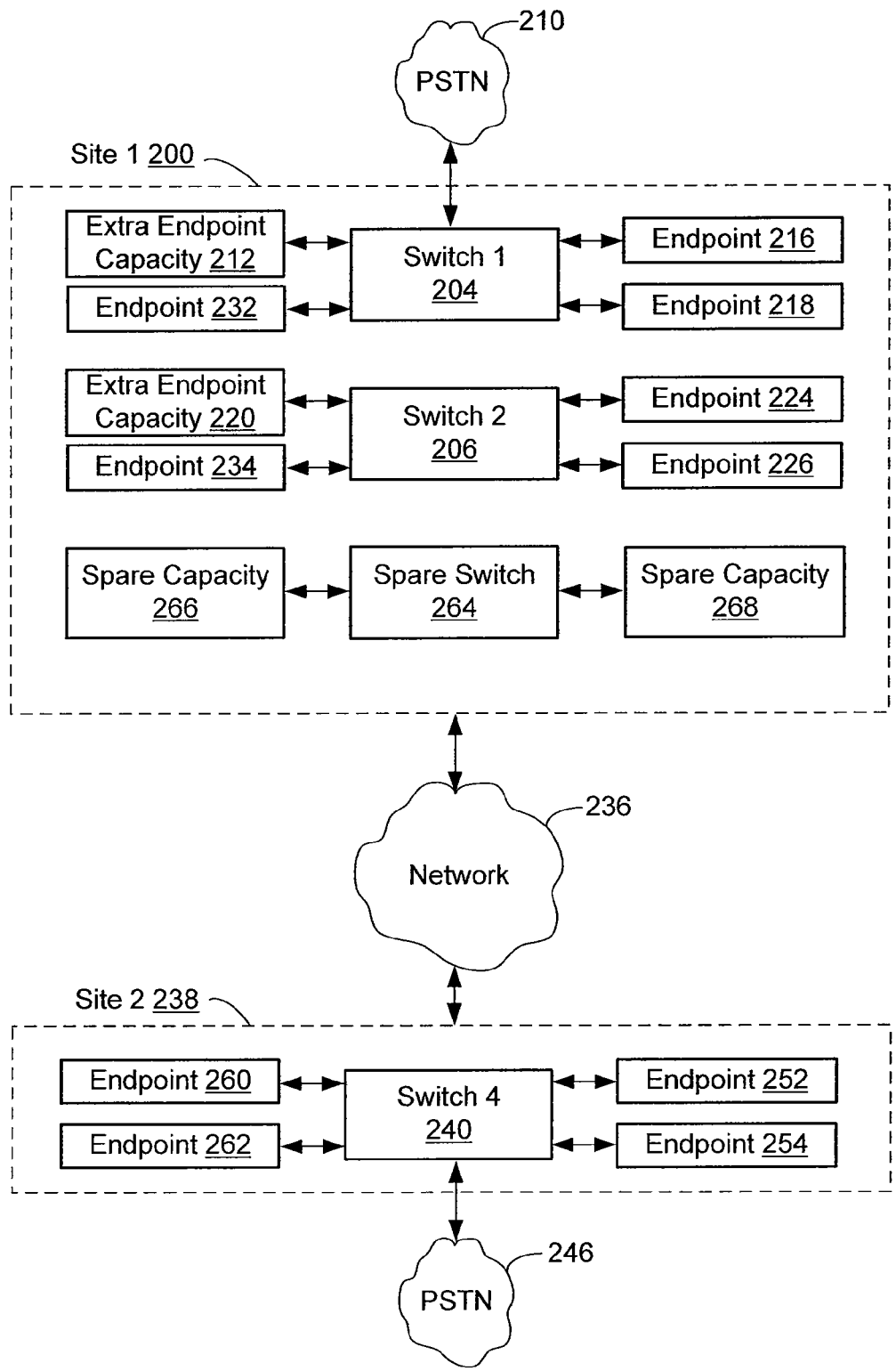
FIG. 2 is a simplified block diagram of a distributed VoIP system utilizing a spare switch according to an embodiment of the present invention.

FIG. 2 is a simplified block diagram of a distributed VoIP system utilizing a spare switch according to an embodiment of the present invention. The system illustrated in FIG. 2 includes first site 200 coupled with second site 238 by network 236. Network 236 may be the Internet or another packet switched network over which the distributed VoIP system operates. As used herein, a site represents a grouping of resources. One skilled in the art will note that sites can be physically distinct from each other, or merely topology-related groupings that are not in physically distinct locations. As illustrated in FIG. 2, one site can have the capacity to support more endpoints than another site within the same VoIP system. While two sites are shown in FIG. 2, the present invention may apply to distributed VoIP systems with more than two sites.

First site 200 includes spare switch 264. Spare switch 264 has spare capacity 266, 268. In one embodiment, spare switch 264 may be configured as a "virtual switch" to support endpoints at either first site 200 or second site 238. For example, in the event of a failure of fourth switch 240 at second site 238, spare switch 264 can be configured to host endpoints 252, 254, 260, 262. Alternatively, in the event of a failure of a switch at first site 100, spare switch 264 can be configured to host the endpoints of the failed switch. In other embodiments, spare switch 264 may be used to host endpoints that are added at a particular site that does not have the capacity to host the endpoints. Thus, as explained more fully below, some embodiments of the present invention utilize a spare switch to provide redundant capacity for multiple sites across a distributed VoIP system.

As illustrated in FIG. 2, first site 200 includes first switch 204, second switch 206, and spare switch 264. First switch 204 is coupled to endpoints 216, 218, 232 and has extra endpoint capacity 212. Second switch 206 is coupled to endpoints 224, 226, 234 and has extra endpoint capacity 220. Switches 204, 206, 264 and endpoints 216, 218, 232, 224, 226, 234 can communicate with each other on a local network at first site 200. In one embodiment, first switch 204 and second switch 206 are configured to provide telephony services to endpoints 216, 218, 232 and 224, 226, 234. As an example, first switch 204 and second switch 206 may communicate with endpoints 216, 218, 232 and 224, 226, 234, respectively, to establish communications channels that are used to make and receive calls. Further, switches 204, 206 may manage call setup or resource allocation by provisioning an extension for each of the endpoints. In one embodiment, extra endpoint capacity 212, 220 provides extra capacity that can be used for additional endpoints as needed.

First switch 204 is also coupled to PSTN 210. First switch 204 and PSTN 210 may be linked via an analog or digital trunk line (e.g., a T1 or E1 interface). In the illustrated configuration, first switch 204 may provide an interface for calls originating from or terminating on PSTN 210.

Second site 238 includes fourth switch 240. Fourth switch 240 is coupled to endpoints 252, 254, 260, 262. Fourth switch 240 and endpoints 252, 254, 260, 262 can communicate with each other on a local network at second site 238. In one embodiment, fourth switch 240 is configured to provide telephony services to endpoints 252, 254, 260, 262. As an example, fourth switch 240 may communicate with endpoints 252, 254, 260, 262 to establish communications channels that are used to make and receive calls. Further, fourth switch 240 may manage call setup or resource allocation by provisioning an extension for each of the endpoints. Fourth switch 240 is also coupled to PSTN 246. Fourth switch 240 and PSTN 246 may be linked via an analog or digital trunk line (e.g., a T1 or E1 interface). In the illustrated configuration, fourth switch 242 may provide an interface for calls originating from or terminating on PSTN 246.

As mentioned previously, spare switch 264 may be utilized to provide redundant switch capacity for first site 200 and second site 238. Utilizing a spare switch as illustrated in FIG. 2 may reduce the required number of switches in a distributed VoIP system without reducing the capacity of each site. Although FIG. 2 shows spare switch 264 at first site 200, according to embodiments of the present invention, spare switch 264 is not restricted to a particular site. Furthermore, although FIG. 2 shows one spare switch, a distributed VoIP system may include more than one spare switch in accordance with embodiments of the invention.

In a distributed VoIP system with more than one spare switch, the spare switch that will be used to provide additional capacity for a particular site may be selected based upon a number of different factors. For example, in one embodiment the spare switch may be selected based on a site hierarchy. Here, each site in the VoIP system has a pre-configured relationship to each of the other sites. When a switch fails, a search is performed to locate a spare switch. The order that each site is searched may depend on the relationship of each site with the site where the switch failed. In another embodiment, the spare switch may be selected based on the inter-site bandwidth between the site of the spare switch and the site of the failed switch. In another embodiment, the spare switch may be selected based on the endpoint capacity of the spare switch and of the failed switch. In another embodiment, the spare switch may be selected based on the type of switch that failed. In yet another embodiment, the spare switch may be selected by comparing available bandwidth with expected bandwidth. Some embodiments may use a combination of these factors and/or other factors in selecting a spare switch.

In one embodiment, spare switch 264 is configured to be in a standby mode when not hosting endpoints. In some embodiments, when a switch in the system fails a spare switch in a standby mode is configured automatically with the specific configuration requirements of the site where the switch failed. In other embodiments, when a particular site does not have extra endpoint capacity to support additional endpoints that are added to the site, spare switch 264 is configured automatically with the specific configuration requirements of the particular site. Once configured, spare switch 264 may be considered to be in an active rather than a standby mode. In the active mode, endpoints from the particular site can be registered with spare switch 264.

As used herein, registering an endpoint with a switch includes establishing communications between the endpoint and the switch. Site specific configuration requirements may also be associated with the endpoint such as time-zone, language preference, dialing prefix, local area code, and other information.

In a further embodiment, spare switch 264 may be configured with the configuration requirements of a particular site only if spare switch 264 is in the standby mode. If spare switch 264 is not in the standby mode, spare switch 264 is not configured with site specific configuration requirements and thus does not provide redundant capacity to a particular site. This feature may be used, for example, to ensure that spare switch 264 it not configured with the specific configuration requirements of a particular site while hosting endpoints from a different site.

In some embodiments, spare switch 264 is configured with the specific configuration requirements of a particular site only if no extra endpoint capacity is available on any of the active switches at that site. In these embodiments, spare switch 264 is configured and used to host endpoints only after all of the extra endpoint capacity at the site is in use. This ensures that spare switch 264 is used for redundant capacity only after the extra capacity available on active switches at a particular site has been fully utilized (i.e., all available capacity on active switches is being used).

In some embodiments, when spare switch 264 is utilized to backup a failed switch, the endpoints that were hosted by the failed switch prior to the failure are automatically transferred to the spare switch. For example, in one embodiment each switch is monitored so that when a failure occurs, a spare switch is located and configured with the specific configurations requirements of the site where the switch failed. The endpoints that were hosted by the failed switch can then be transferred to the spare switch. Thus, after a spare switch is configured with the specific configuration requirements of the site where the switch failed, the endpoints that were being hosted by the failed switch at the time of the failure are automatically registered with the spare switch. According to some embodiments, these endpoints are registered with the spare switch without interrupting calls in progress at the time of the failure. As an example, a call that is established while an endpoint is registered with a switch that later fails is not interrupted when the endpoint is registered with the spare switch. In some embodiments, calls in progress at the time an endpoint is registered with a spare switch are monitored and terminated after a predetermined time period (e.g., several hours). This may be used, for example, to terminate orphaned calls.

In some embodiments, spare switch 264 is utilized to host endpoints for a particular site only until that site has established sufficient capacity to host the endpoints. For example, if spare switch 264 is utilized to host the endpoints of a failed switch, and the failed switch is brought back online, the endpoints may be transferred automatically from spare switch 264 to the original switch. Alternatively, once the site has established sufficient capacity to host the endpoints, the endpoints may be transferred automatically from spare switch 264 back to the site. A load balancing process may be used to distribute the endpoints to available switches at the site. In some embodiments, an endpoint is not transferred from spare switch 264 during an active call. In this embodiment, the transfer of endpoints from spare switch 264 may occur over a period of time. During this period of time, new requests for switch capacity will be assigned to other active switches at the site rather than spare switch 264. Spare switch 264 may return to a standby mode after all the endpoints are transferred. In some embodiments, transfer of the endpoints from the spare switch is performed automatically upon returning the failed switch to an online or active mode. In other embodiments, the procedure is performed by a system administrator.

In still further embodiments, when spare switch 264 is utilized to host endpoints at another site (e.g., site 238), spare switch 264 may have a "self-knowledge" of its remoteness from the site and minimize use of network 236 for call progress media that would ordinarily be provided (e.g., tones, music on hold, voice prompts). In one embodiment, spare switch 264 relies on local switches (i.e., switches at the same site as the failed switch) to provide such call progress media or uses other call progress indication methods.

Figure 3:
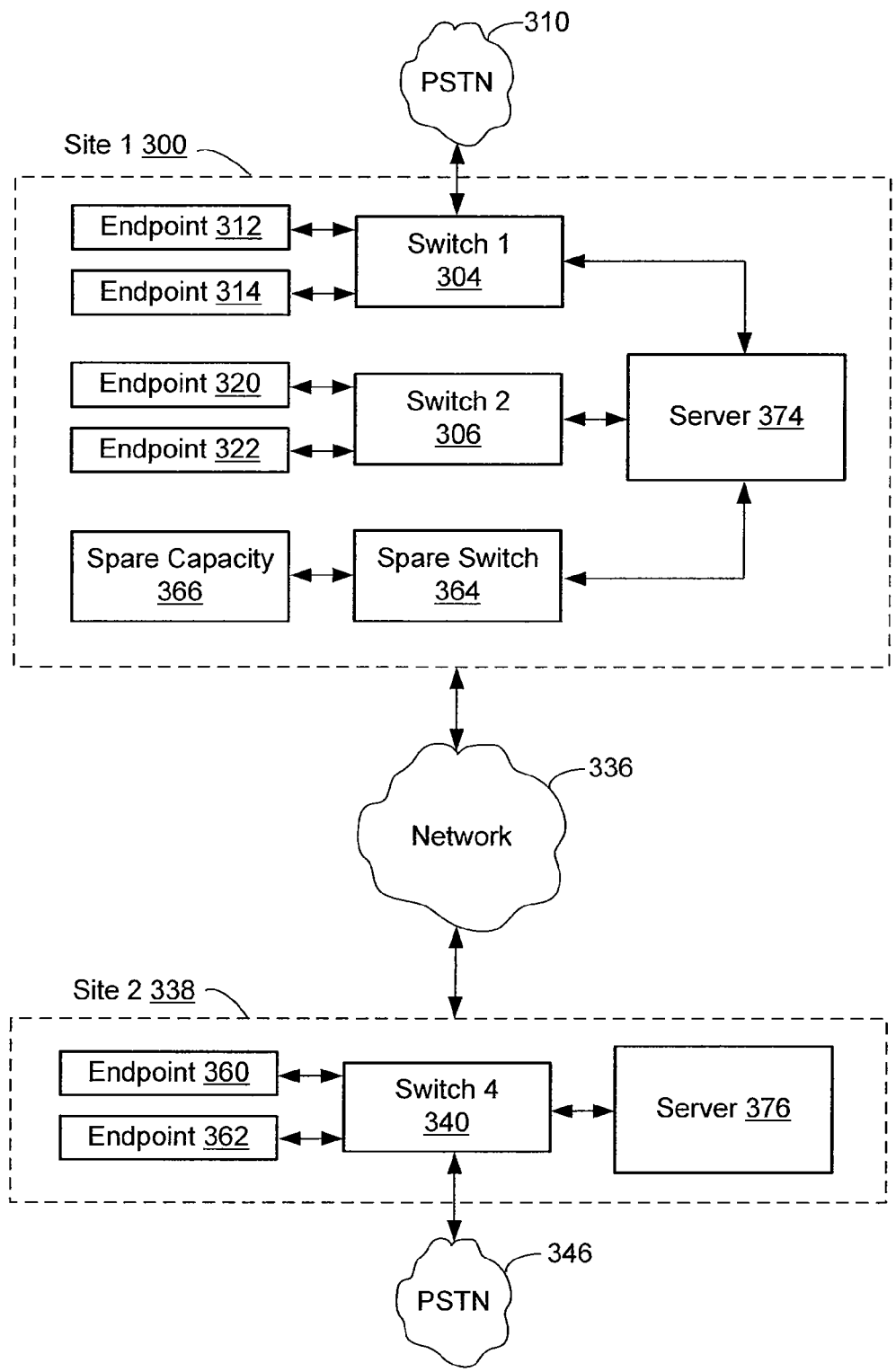
FIG. 3 is a simplified block diagram of a distributed VoIP system utilizing a spare switch according to another embodiment of the present invention.

FIG. 3 is a simplified block diagram of a distributed VoIP system utilizing a spare switch according to another embodiment of the present invention. The system illustrated in FIG. 3 includes first site 300 coupled with second site 338 by network 336. First site 300 includes first switch 304, second switch 306, and spare switch 364. First switch 304 is coupled to PSTN 310, endpoints 312, 314, and server 374. Second switch 306 is coupled to endpoints 320, 322, and server 374. Spare switch 364 has spare capacity 366 and is coupled to server 374. Switches 304, 306, 364; server 374; and endpoints 312, 314, 320, 322 can communicate with each other on a local network at first site 300. Second site 338 includes fourth switch 340 coupled to PSTN 346, endpoints 360, 362, and server 376. Fourth switch 340, server 376, and endpoints 360, 362 can communicate with each other on a local network at second site 338.

In this embodiment, servers 374, 376 are configured to implement some of the features and functions of the present invention. For example, either of the servers 374, 376 may receive a request to register an endpoint with a switch. The server may receive a request from endpoints at the same site as the server (i.e., at the local site). After receiving a request, the server determines if any of the local switches have extra endpoint capacity. If the local switches have extra endpoint capacity, the endpoint may be registered with one of the switches with extra endpoint capacity. If the local switches do not have extra endpoint capacity, the server will determine if there is a local spare switch. A local spare switch is a spare switch at the local site. If there is a local spare switch and it is needed, it will be configured with the specific configuration requirements of the local site. The endpoint is then registered with the local spare switch. If there is not a local spare switch, the server can identify a spare switch at another site (i.e., at a remote site). The remote spare switch may be configured with the specific configuration requirements of the local site, and the endpoint is then registered with the remote spare switch.

Figure 4:
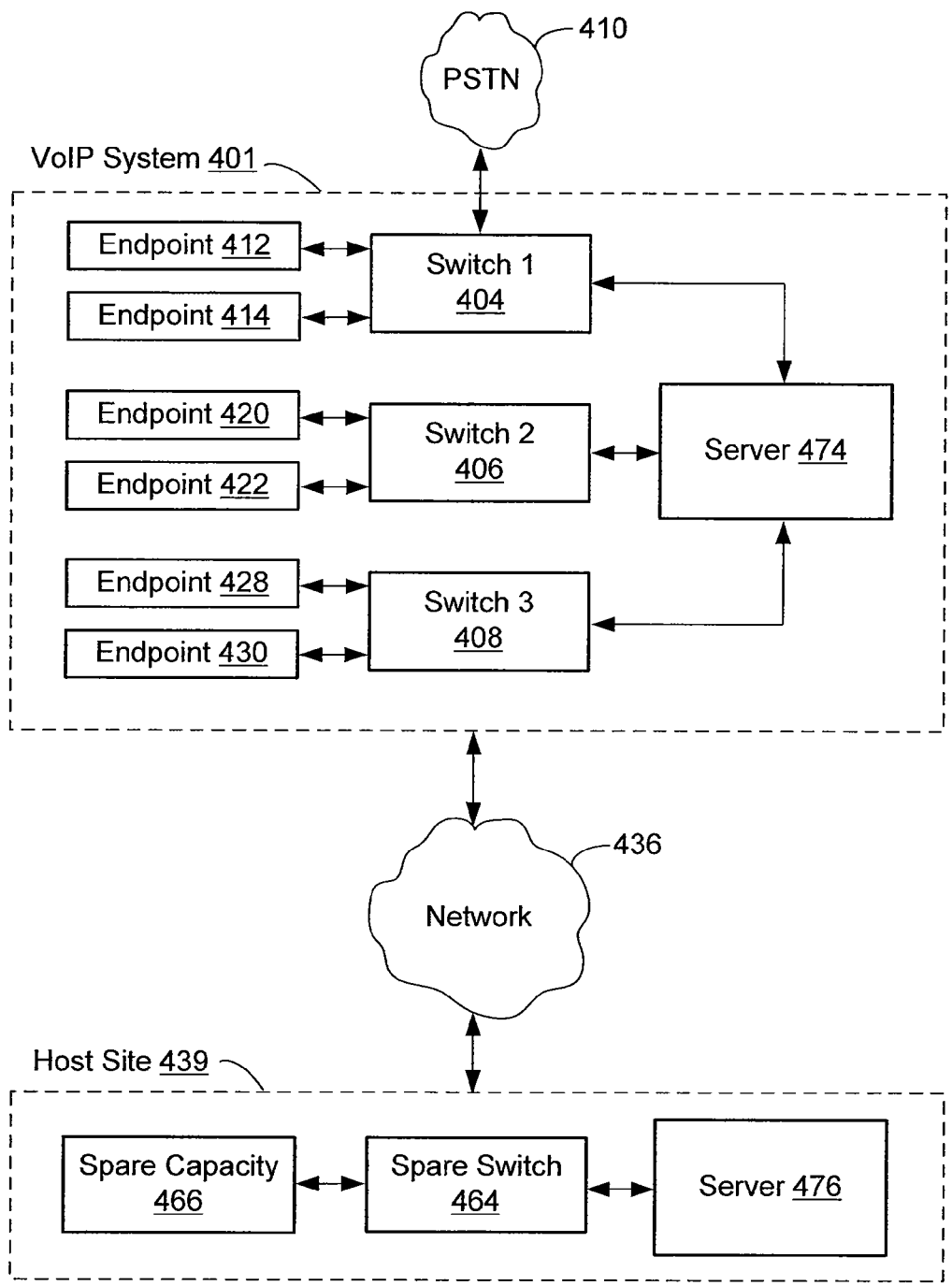
FIG. 4 is a simplified block diagram of a distributed VoIP system utilizing a spare switch according to another embodiment of the present invention.

FIG. 4 is a simplified block diagram of a distributed VoIP system utilizing a spare switch according to another embodiment of the present invention. The system illustrated in FIG. 4 includes VoIP system 401 and host site 439 coupled by network 436. VoIP system 401 includes first switch 404, second switch 406, and third switch 408. First switch 404 is coupled to PSTN 410, endpoints 412, 414, and server 474. Second switch 406 is coupled to endpoints 420, 422, and server 474. Third switch 408 is coupled to endpoints 428, 430, and server 474. Switches 404, 406, 408; server 474; and endpoints 412, 414, 420, 422, 428, 430 can communicate with each other on a local network at first site 400. Host site 439 includes spare switch 464 with spare capacity 466. Spare switch 464 is coupled to server 476. Spare switch 464 and server 476 can communicate with each other on a local network at host site 439

As illustrated in FIG. 4, spare switch 464 is at a site external to VoIP system 401. For example, in some embodiments host site 439 may be a site that hosts one or more spare switches. Host site 439 and VoIP system 401 are linked via network 436 and thus spare switch 464 provides redundant capacity for VoIP system 401, despite being external to the system. As an example, a VoIP system provider may provide and maintain host site 439 as redundant capacity for a customer that has implemented VoIP system 401. In this example, spare switch 464 may be dedicated to VoIP system 401, or may be redundant capacity that is shared by more than one VoIP system.

Figure 5:
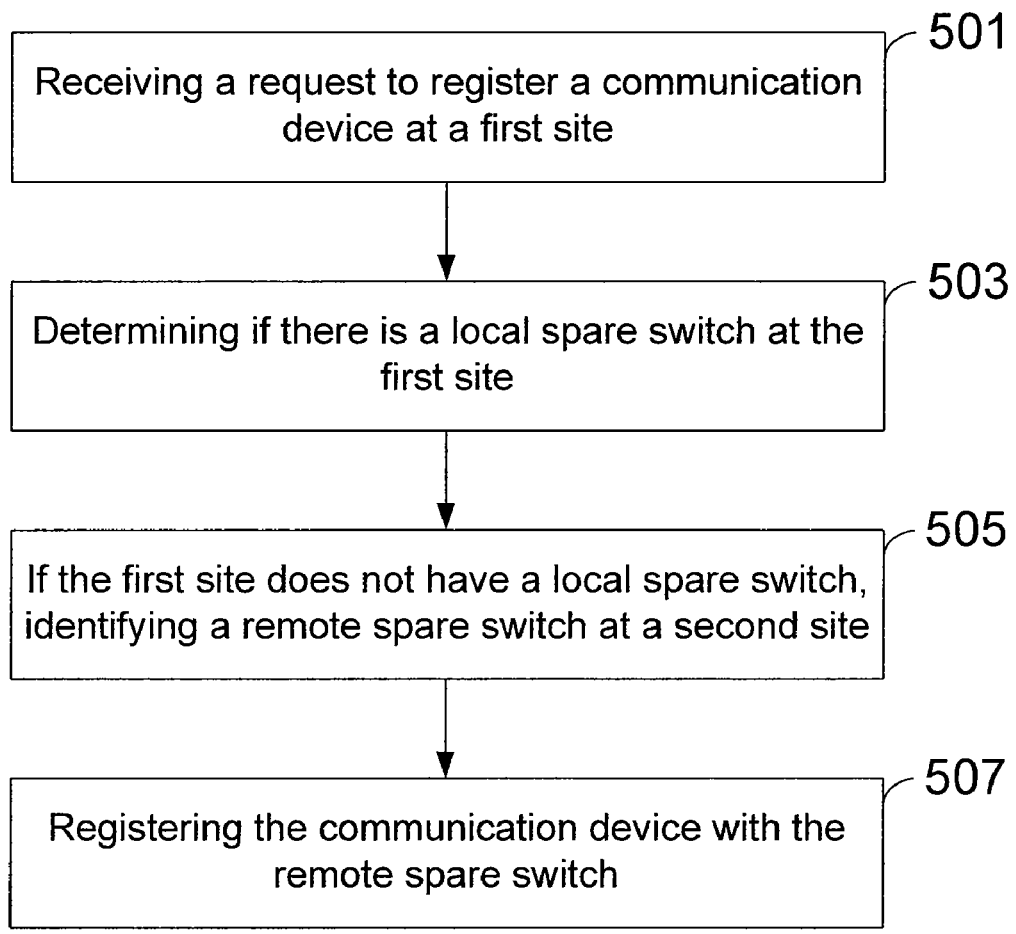
FIG. 5 is a simplified flowchart illustrating a method for providing telephony services in a distributed VoIP system according to an embodiment of the present invention.
Figure 6:
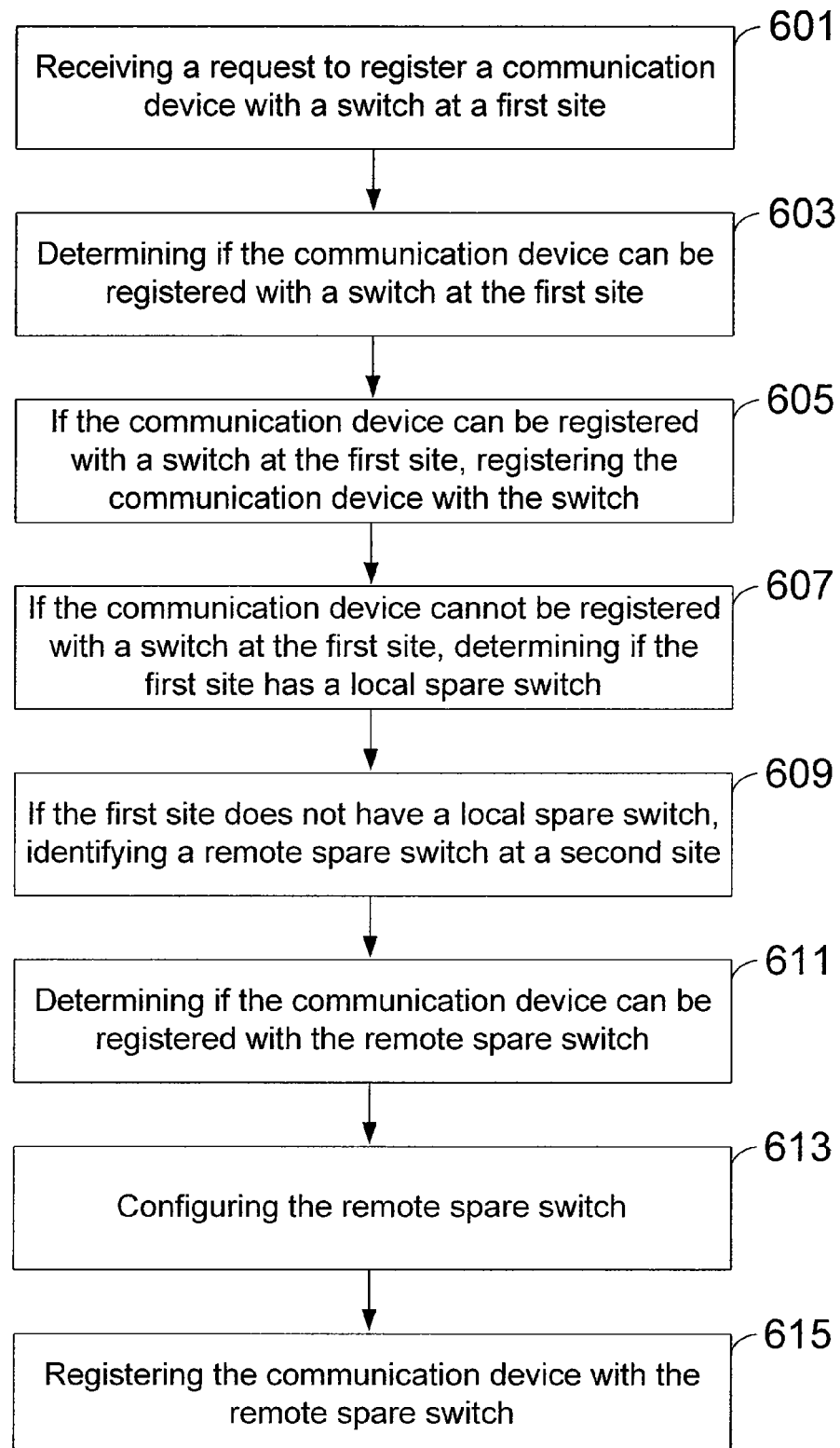
FIG. 6 is a simplified flowchart illustrating a method for providing telephony services in a distributed VoIP system according to another embodiment of the present invention.

FIGS. 5 and 6 are simplified flowcharts illustrating methods for providing telephony services in a distributed VoIP system according to embodiments of the present invention. It should be understood that the flowcharts are provided to describe preferred methods. Other sequences and steps may be performed in accordance with other embodiments of the invention. For example, the steps outlined may be performed in a different order. Moreover, the individual steps may include multiple sub-steps that may be performed in various sequences as appropriate. Furthermore, additional steps may be added or steps may be removed depending on the particular application.

In FIG. 5, a request is received to register a communication device at a first site (Step 501). The request usually will be generated by an endpoint at the first site. In some embodiments, the request may be generated when an endpoint is unable to communicate with a switch. For example, in many VoIP systems endpoints are configured to send periodic signals to a switch to verify communications between the endpoint and the switch. If the switch does not respond to a signal, the endpoint assumes a failure has occurred, for example, within the switch or with the communication channel between the endpoint and the switch. In other embodiments, the request may be generated by an endpoint that is being added to a site in the VoIP system.

At step 503 a determination is made if there is a local spare switch at the first site. A local spare switch is one that is at the same site as the endpoint requesting the registration. In step 505, if the first site does not have a local spare switch, a remote spare switch at a second site is identified. The remote spare switch is at a different site than the endpoint requesting the registration. Identifying a remote spare switch usually involves searching each site within the distributed VoIP system for a spare switch. Once a spare is located, in step 507 the communication device is registered with the remote spare switch. This step usually includes configuring the remote spare switch with the specific configuration requirements of the local site and registering the endpoint with the remote spare switch.

In FIG. 6, a request is received to register a communication device with a switch at a first site (Step 601). Step 603 involves determining if the communication device can be registered with a switch at the first site. For example, this step usually involves determining if any of the switches at the first site have extra endpoint capacity. In step 605, if a switch at the first site has extra endpoint capacity, the communication device will be registered with that switch. In step 607, if the communication device cannot be registered with a switch at the first site (for example, if none of the switches at the first site have extra endpoint capacity), a determination is made if the first site has a local spare switch. If there is a local spare switch at the first site, the local spare switch is configured with the specific configuration requirements of the first site, and the communication device is then registered with the local spare switch.

In step 609, if the first site does not have a local spare switch, a remote spare switch is identified at a second site. At step 611 a determination is made if the communication device can be registered with the remote spare switch. For example, in some embodiments the communication device may not be registered with the remote spare switch if the remote spare switch is not in a standby mode. In step 613 the remote spare switch is configured with the specific configuration requirements of the first site. In step 615 the communication device is registered with the remote spare switch.

Some embodiments of the present invention include waiting a period of time after receiving a request to register a communication device with a switch at a first site (Steps 501, 601). Waiting a period of time avoids unnecessary utilization of the spare switch for temporary interruptions. For example, in some embodiments a switch is re-booted following a failure, and the period of time is a predetermined length of time that is sufficiently long to allow the failed switch to complete the re-boot procedure. This feature may be used to ensure that a spare switch is not configured and utilized as a backup if the failure can be remedied by re-booting the switch. As another example, an endpoint may temporarily loose communications with a switch, and the communications may be restored relatively quickly thus avoiding unnecessary utilization of the spare switch. Waiting a period of time ensures the spare switch is available for situations where the failed switch is not restored following a temporary interruption.

Other embodiments may prioritize the communication devices in the system. This may be used, for example, to ensure that the registration of a prioritized communication device (one having a higher priority than a non-prioritized communication device) is not delayed. As an example, if a request to register a prioritized communication device is received (Steps 501, 601), the registration of a non-prioritized communication device at the same site may be terminated to provide capacity for the prioritized communication device. The prioritized communication device is then registered with the switch, and steps 603 through 615 are followed to register the non-prioritized communication device.

It is to be understood that FIGS. 1-6 are presented as exemplary embodiments to illustrate some of the features and functionality of the present invention. Not all distributed VoIP systems include the components shown in these figures. Likewise, some distributed VoIP systems include additional components that are not shown. One skilled in the art will note that distributed VoIP systems may include numerous configurations. For example, in some configurations the components shown in FIGS. 1-4 may be combined and/or provide functionality that is different from that described herein. Thus, the present invention can be embodied in many different forms and should not be construed as limited to the embodiments set forth herein.

Also note that in FIGS. 1-4 the links between the various components are shown using arrows. These links are not limited to physical connections, but may also represent logical connections between the components. Where the links represent physical connections, they may represent wired or wireless connections. For example, FIG. 1 shows first switch 104 linked with endpoints 116, 118. These links may be wired, wireless, or a combination of wired and wireless technologies.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A distributed VoIP system comprising:
a network;
a first switch at a first site coupled to the network, wherein the first switch is configured to provide telephony services to a first communication device, the first site comprising a first grouping of resources having first configuration requirements;
a second switch at a second site coupled to the network, wherein the second switch is configured to provide telephony services to a second communication device, the second site comprising a second grouping of resources having second configuration requirements different from the first configuration requirements; and
a spare switch coupled to the network, wherein if the first communication device is unable to register with the first switch, the spare switch is configured to provide telephony services to the first communication device, and wherein if the second communication device is unable to register with the second switch, the spare switch is configured to provide telephony services to the second communication device.

2. The distributed VoIP system of claim 1 wherein the spare switch is at a third site.

3. The distributed VoIP system of claim 1 wherein the first communication device and the second communication device are IP phones.

4. The distributed VoIP system of claim 1 wherein the first communication device is selected from a group consisting of IP phone, soft phone, button box, conference bridge port, and IP trunk, and the second communication device is selected from the group consisting of IP phone, soft phone, button box, conference bridge port, and IP trunk.

5. The distributed VoIP system of claim 1 wherein the spare switch is configured to be in a standby mode if the first communication device is registered with the first switch and the second communication device is registered with the second switch.

6. A method for providing telephony services in a distributed VoIP system, the method comprising:
receiving a request to register a communication device at a first site, the first site comprising a first grouping of resources having first configuration requirements, the first site being one of a plurality of sites in the distributed VoIP system;
determining if there is a local spare switch at the first site; and
if the first site does not have the local spare switch, identifying a remote spare switch at a second site and registering the communication device with the remote spare switch, the second site comprising a second grouping of resources having second configuration requirements different from the first configuration requirements.

7. The method of claim 6 further comprising:
after registering the communication device with the remote spare switch, transferring the registration of the communication device from the remote spare switch to a switch at the first site; and
configuring the remote spare switch as a spare switch.

8. The method of claim 6 further comprising:
after receiving the request to register the communication device at the first site and prior to registering the communication device with the remote spare switch, waiting a period of time, wherein the period of time is predetermined based at least in part on a time duration required to re-boot a failed switch.

9. The method of claim 6 wherein registering the communication device comprises establishing communications between the communication device and the remote spare switch.

10. The method of claim 6 wherein the second site is within the distributed VoIP system.

11. The method of claim 6 wherein the second site is external to the distributed VoIP system.

12. The method of claim 6 wherein the communication device is selected from a group consisting of IP phone, soft phone, button box, conference bridge port, and IP trunk.

13. The method of claim 6 wherein the request to register the communication device at the first site is sent following a failure of a switch at the first site, and wherein the communication device is registered with the remote spare switch without interrupting a call established while the communication device was registered with the switch at the first site.

14. The method of claim 6 wherein the request to register the communication device at the first site is sent following a failure of a switch at the first site, the method further comprising:
registering one or more additional communication devices with the remote spare switch, the one or more additional communication devices being registered with the switch prior to the failure of the switch.

15. The method of claim 6 further comprising:
prior to registering the communication device with the remote spare switch, configuring the remote spare switch to provide telephony services to the communication device at the first site.

16. The method of claim 15 wherein configuring the remote spare switch comprises establishing a time zone, a language preference, a dialing prefix, and a local area code associated with the first site.

17. The method of claim 15 further comprising:
prior to configuring the remote spare switch, determining that the remote spare switch is in a standby mode, wherein the remote spare switch can be configured to provide telephony services to the communication device when the remote spare switch is in the standby mode.

18. A method for providing telephony services in a distributed VoIP system, the method comprising:
receiving a request to register a communication device with a switch at a first site, the first site comprising a first grouping of resources having first configuration requirements, the first site being one of a plurality of sites in the distributed VoIP system;
determining if the communication device can be registered with the switch;
if the communication device can be registered with the switch, registering the communication device with the switch;
if the communication device cannot be registered with the switch, determining if the first site has a local spare switch; and
if the first site does not have the local spare switch, identifying a remote spare switch at a second site, determining that the communication device can be registered with the remote spare switch, configuring the remote spare switch to provide telephony services to the communication device at the first site, and registering the communication device with the remote spare switch, wherein the second site comprising comprises a second grouping of resources having second configuration requirements different from the first configuration requirements.

19. The method of claim 18 wherein determining that the communication device can be registered with the remote spare switch comprises determining that the remote spare switch is in a standby mode.

20. The method of claim 18 further comprising:
after receiving the request to register the communication device with the switch, and prior to determining if the first site has the local spare switch, waiting a period of time, wherein the period of time is predetermined based at least in part on a time duration required to re-boot a failed switch.

21. The method of claim 18 wherein the communication device is a prioritized communication device, the prioritized communication device having a higher priority than a non-prioritized communication device that is registered with the switch, the method further comprising:
terminating the registration of the non-prioritized communication device with the switch, and
registering the prioritized communication device with the switch.

22. The method of claim 18 wherein the communication device is selected from a group consisting of IP phone, soft phone, button box, conference bridge port, and IP trunk.

23. The method of claim 18 wherein the remote spare switch does not provide call progress media to the communication device.

24. The method of claim 23 wherein the call progress media is provided to the communication device by an active switch at the first site.

* * * * *